United States Patent [19]
Himeno et al.

[11] Patent Number: 5,943,452
[45] Date of Patent: Aug. 24, 1999

[54] ARRAYED-WAVEGUIDE GRATING

[75] Inventors: Akira Himeno; Katsunari Okamoto; Hiroshi Takahashi, all of Mito, Japan

[73] Assignee: Nippon Telegraph and Telephone Corporation, Tokyo, Japan

[21] Appl. No.: 08/906,145

[22] Filed: Aug. 5, 1997

[30] Foreign Application Priority Data

Aug. 6, 1996 [JP] Japan ................................ 8-206754

[51] Int. Cl.$^6$ .............................. G02B 6/26; G02B 6/42
[52] U.S. Cl. ................................ 385/15; 385/37; 385/46; 385/14
[58] Field of Search ................................ 385/15, 37, 46, 385/24, 14, 45, 27, 39

[56] References Cited

U.S. PATENT DOCUMENTS

| 5,212,758 | 5/1993 | Adar et al. ............................... | 385/129 |
| 5,339,157 | 8/1994 | Glance et al. ............................ | 385/24 |
| 5,706,377 | 1/1998 | Li .............................................. | 385/37 |
| 5,793,907 | 8/1998 | Jalali et al. ............................... | 385/24 |

FOREIGN PATENT DOCUMENTS

| 6 27339 | 2/1994 | Japan ...................................... | 385/129 |

OTHER PUBLICATIONS

"ExtremelyCompact 1.31–1.55 μm Phased Array Duplexer onInP with –30 dB Crosstalk over 100 nm", 22$^{nd}$ European Conference on Optical Communication; Sep. 15–19, 1996, Olso Norway; pp. 3.iii –3.134.

Vellekoop et al. "A Small–Size Polarization Splitter Based on a Planar Optical Phased Array" Journal of Lightwave Technology vol. 8, No. 1, Jan. 1990, New York, US, pp. 118–124.

Vellekoop et al. "Four–Channel Integrated–Optic Wavelength Demultiplexer With Weak Polarization Dependence" Journal of Lightwave Technology, vol. 9, No. 3, Mar. 1991, pp. 310–314.

Amersfoort et al. "High Performance 4–Channel PHASAR Wavelength Demultiplexer Integrated with Photodetectors" Proceedings of the European Conference on Optical Communication, Sep. 12–16, 1993, vol. 3, No. CONF 9, pp. 49–52.

Adar et al. Broad–Band Array Multiplexers Made with Silica Waveguides on Silicon Journal of Lightwave Technology, Feb. 11, 1993, No. 2, New York, U.S. pp. 212–219.

Mestric et al. 1.31–1.55 μm Phased–Array Demultiplexer on InP, IEEE Photonics Technology Letters, vol. 8, No. 5, May 1996, pp. 638–640.

*Primary Examiner*—Phan T. H. Palmer
*Attorney, Agent, or Firm*—Venable; Robert J. Frank

[57] ABSTRACT

An arrayed waveguide grating including an input waveguide or input waveguides, an input side slab waveguide lens, arrayed waveguides, an output side slab waveguide lens, and an output waveguide or output waveguides, wherein an optical length of the arrayed waveguides monotonically increases or decreases by a constant value between adjacent waveguides; the arrayed waveguides include an input side waveguide block, an intermediate waveguide block, and an output side waveguide block; the intermediate waveguide block includes at least one fan-formed waveguide block, the fan-formed waveguide block is coaxial, equal in vertical angle, and monotonically increases or decreases by a constant value in radius between adjacent waveguides; and the input side waveguide block and the output side waveguide block are line symmetrical about a bisector of the vertical angle of the intermediate waveguide block.

4 Claims, 8 Drawing Sheets

ARRAYED-WAVEGUIDE GRATING

BACKGROUND OF THE INVENTION

1. Field of the Invention

The present invention relates to an optical filter (optical wave multiplexer/divider) for use in wavelength division multiplexed transmissions.

2. Description of the Prior Art

<Prior Art Embodiment 1>

First, a first prior art embodiment will be described with reference to FIG. 1.

FIG. 1 is a schematic view of a prior art optical filter (optical wave multiplexer/divider) for wavelength division multiplexed communications.

In FIG. 1, the reference numerals 01 and 02 indicate slab waveguide lenses, 03 is arrayed waveguides, 04 is an input waveguide or input waveguides, and 05 is an output waveguide or output waveguides.

In this case, to appropriately operate the arrayed waveguide grating type optical filter, it is required that in the arrayed waveguides connecting the slab waveguide lenses 01 and 02, the connection point with the lens is on the extension of the straight line radially drawn from the input/output focus of the slab waveguide lens, and lengths of all waveguides adjacent to each other differ by a constant value required in design, and the lengths geometrically increase or decrease monotonically.

The above arrayed waveguides 03, as shown in FIG. 1, is arrayed waveguides 03 each of which comprises a straight waveguide 03a—a bend waveguide 03b—a straight waveguide 03c, which are individually connected.

It is known that characteristics such as optical loss, crosstalk, and the like in the arrayed waveguide grating are improved with decreasing length of the arrayed waveguides.

In view of the fact, it is desirable that a shortest waveguide length is zero, however, the practical bend waveguide radius must be greater than a constant value determined by the waveguide structure, and the shortest waveguide length is a finite value from the requirement of optical waveguide layout.

The arrayed waveguide grating type filter shown in FIG. 1 is experimentally known that the shortest waveguide length can be practically reduced and, as a result, have superior characteristics.

However, the above arrayed waveguide grating type filter is defective in that, in the lower waveguide and the upper waveguide of the arrayed waveguides 03, the upper one is apparently longer in length.

On the other hand, in a filter of wider wavelength spacing, it is required to set the optical length difference to a very small value.

Specifically, where $d_0$ is a difference in length between adjacent waveguides of the above arrayed waveguides 03, $\lambda_0$ is a central wavelength, and $n_g$ is a group refractive index, a free spectral range (FSR) is represented by the formula (1).

$$\text{Wavelength spacing} \times \text{channel number} \approx \lambda_0^2/(d_0 \times n_g) = \text{FSR} \quad (1).$$

Therefore, when the required wavelength spacing is wide or a plurality of channels are required, it is necessary to be set $d_0$ to a very short value.

However, as described above, due to the geometrical limitation, since in the prior art embodiment there is a lower limit of optical length difference that can be disposed, there is a case where setting the optical length difference to a very short value cannot be geometrically found or, even if achieved, the size of the circuit becomes extraordinarily large. If such a device is to be achieved by a waveguide type, since the size of usable substrate material has a certain limit, it is practically impossible to produce such a device when the circuit size exceeds the limit.

Therefore, it has been difficult to achieve with this construction an arrayed waveguide grating with a wide FSR (Free Spectral Range) which is required to be set to a very short optical length difference, that is, an arrayed waveguide grating with wide in wavelength spacing for separation and multiplexing or a plurality of channels.

<Prior Art Embodiment 2>

Next, a second prior art embodiment will be described with reference to FIG. 2. Japanese Patent Application Laying-open No. 6-27339 (corresponding U.S. Pat. No. 5,212,758) discloses an S-formed optical waveguide as the second prior art embodiment.

FIG. 2 is a schematic view showing a prior art arrayed waveguide grating type optical filter.

In FIG. 2, the reference numerals 01 and 02 indicate slab waveguide lenses, 03 is arrayed waveguides, and 06 is a bend waveguide block. As shown in FIG. 2, the slab waveguide lenses 01 and 02 are connected by the S-formed arrayed waveguides 03, and the entire circuit is point symmetrical. The S-formed arrayed waveguide is designed so that when the inflection point of the S form is directly connected, the individual waveguide lengths are equal. That is, the S-formed optical waveguide is constructed so that the optical length difference, which is required from geometrical layout, is once offset at the inflection point.

In the prior art embodiment shown in FIG. 2, the optical length difference required for filter operation is given by the bend waveguide block 06 in which the open angle is the same about the center of symmetry of the S-formed arrayed waveguides 03, spacings are constant, and the radius increases by a constant value.

With this construction, since the optical length difference of circuit is equal to the length difference between the adjacent waveguides of the bend waveguide block 06 (radius difference×open angle), a desired circuit can be designed which has a wide FSR, that is, a very short optical length difference. Therefore, in this configuration, the defect of the first prior art embodiment that the layout cannot be geometrically found is eliminated.

However, the configuration as shown in FIG. 2 has a problem that a width w of the circuit is large due to the point symmetry of the S-formed arrayed waveguide layout.

Therefore, there is a defect in that if the circuit size exceeds the effective substrate size, or even if can be laid out on the substrate, the number of circuits that can be disposed on a single substrate is decreased.

Since the number of circuits that can be produced from a substrate of the same size is an important factor for reducing the price and cost, the above problem reduces the application area of the optical filter.

SUMMARY OF THE INVENTION

A primary object of the present invention is to provide an arrayed waveguide grating which eliminates the S-formed structure which may be a cause of increasing the circuit area and achieves wide FSR properties.

In the first aspect of the present invention, an arrayed waveguide grating comprising an input waveguide or input waveguides, an input side slab waveguide lens, arrayed waveguides, an output side slab waveguide lens, and an output waveguide or output waveguides, characterized in that:

1) an optical length of the arrayed waveguides monotonically increases or decreases by a constant value between adjacent arrayed waveguides;

2) the arrayed waveguides comprises an input side waveguide block, an intermediate waveguide block, and an output side waveguide block;

3) the intermediate waveguide block comprises an odd number of fan-formed waveguide block, the fan-formed waveguide block is a bend waveguide block which is coaxial, equal in vertical angle, and monotonically increases or decreases in radius between adjacent waveguides, and vertical angles of waveguides of the odd number of fan-formed waveguide blocks are disposed alternately, and the individual waveguide blocks are smoothly connected; and 4) the input side waveguide block and the output side waveguide block are disposed line symmetrically about a bisector of the vertical angle of the intermediate waveguide block.

Here, the number of the fan-formed waveguide block constituting the intermediate waveguide block may be one.

Further, 1) the input side waveguide block and the output side waveguid block may comprise a first straight waveguide block, a bend waveguide block, and a second straight waveguide block from the side closer to the input side slab waveguide lens and the output side slab waveguide lens, and the bend waveguide block comprises bend waveguides smoothly connecting to the first straight waveguide block and the second straight waveguide block;

2) optical lengths of the input side waveguide block and the output side waveguide block may monotonically increase or decrease by a constant value between adjacent waveguides; and 3) the input side waveguide block and the output side waveguide block may smoothly connect to the intermediate waveguide block.

Here, all radii of the bend waveguide group may be greater than a minimum radius $R_0$ that causes an unnecessary increase of optical loss.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

All of the bend waveguides in the present invention is included in the fan formed of the outermost bend waveguide.

Specifically, in an arrayed waveguide grating type optical filter with wide FSR properties, of low cost, that is, small in size, arrayed waveguides (first waveguide block) connected to one slab waveguide lens has a same optical length difference to the individual contacting waveguides, and the optical length difference monotonically increases or decreases, the waveguide block being formed of straight—curved—and straight waveguides in this order from the slab waveguide lens, the end points existing on a straight line and having an intersection angle of 90 degrees to the straight line, spacings between adjacent intersection points are constant, and the other arrayed waveguides (second waveguide block) are disposed in plane symmetrically to the above arrayed waveguides (first waveguide block), and both of the waveguide blocks are connected with a bend connection waveguide block.

The optical length difference occurring in the first waveguide block and that occurring in the second waveguide block may have optional values.

The bend connection waveguide block has a function to give an optical length difference which offsets the optical length difference produced in the first and second waveguide blocks which is geometrically required but unnecessary for operation of the circuit, and is required in design.

Therefore, since, with the construction of the present invention, the optical length difference can be flexibly set, a filter of wide FSR properties can be achieved. Further, with the construction of the present invention, it is unnecessary to use a point symmetrical geometrical layout which has been a defect of the second prior art embodiment of the arrayed waveguide grating type optical filter in which the optical length difference is once set to zero only in the waveguide group connected to the slab waveguide lens.

As a result, the problem of too large effective area of the circuit is eliminated.

An embodiment of the present invention will now be described in detail.

Figure 1:
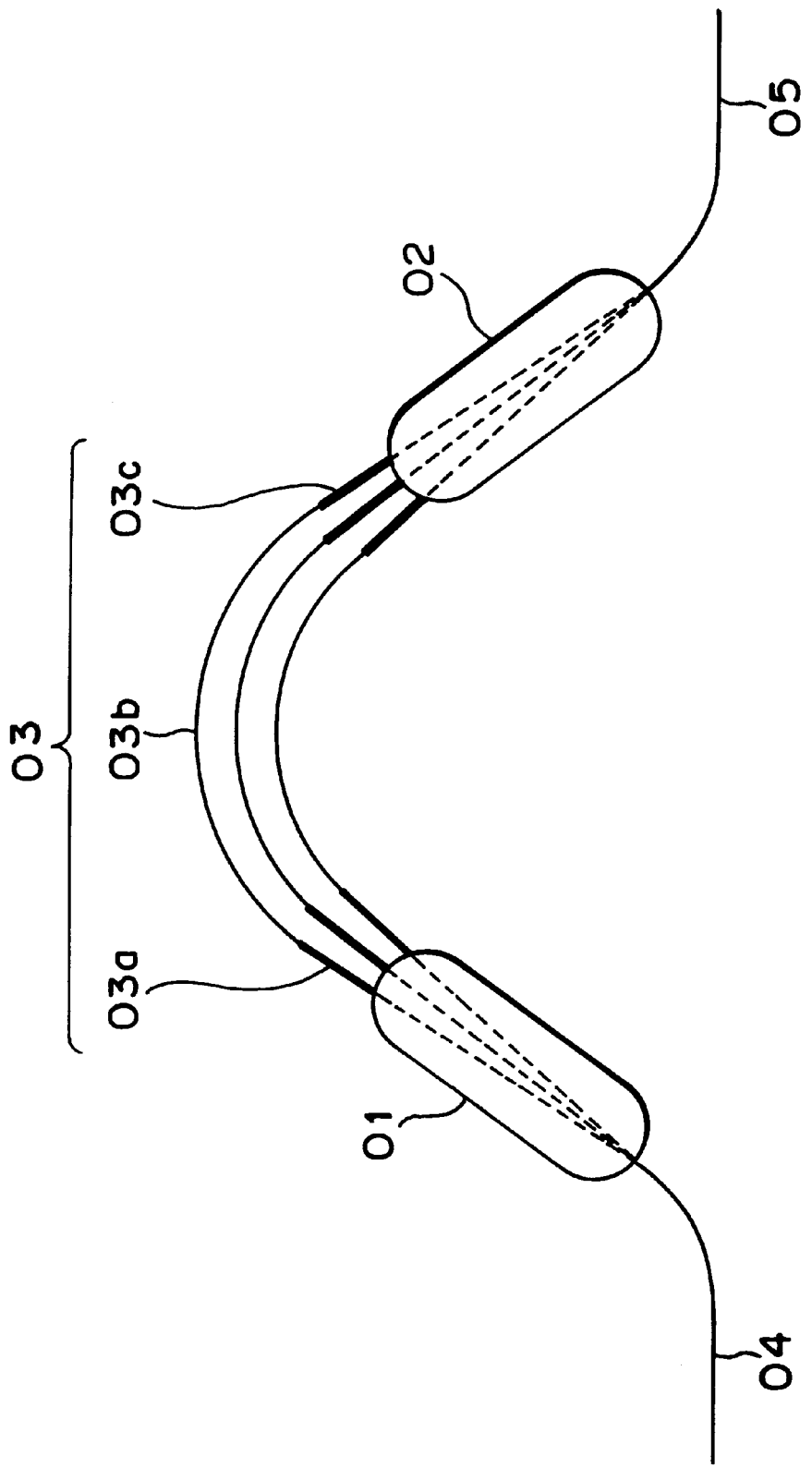
FIG. 1 is a schematic view showing a first prior art embodiment of the optical arrayed waveguide grating filter.
Figure 2:
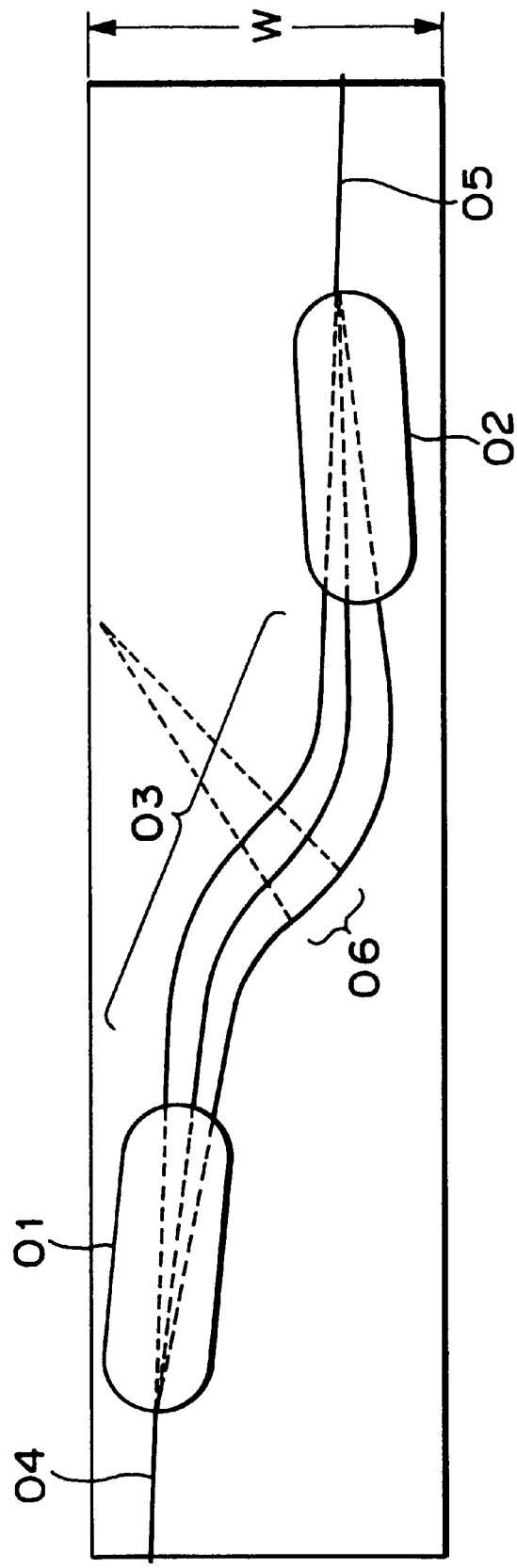
FIG. 2 is a schematic view showing a second prior art embodiment of the optical arrayed waveguide grating filter.
Figure 3:
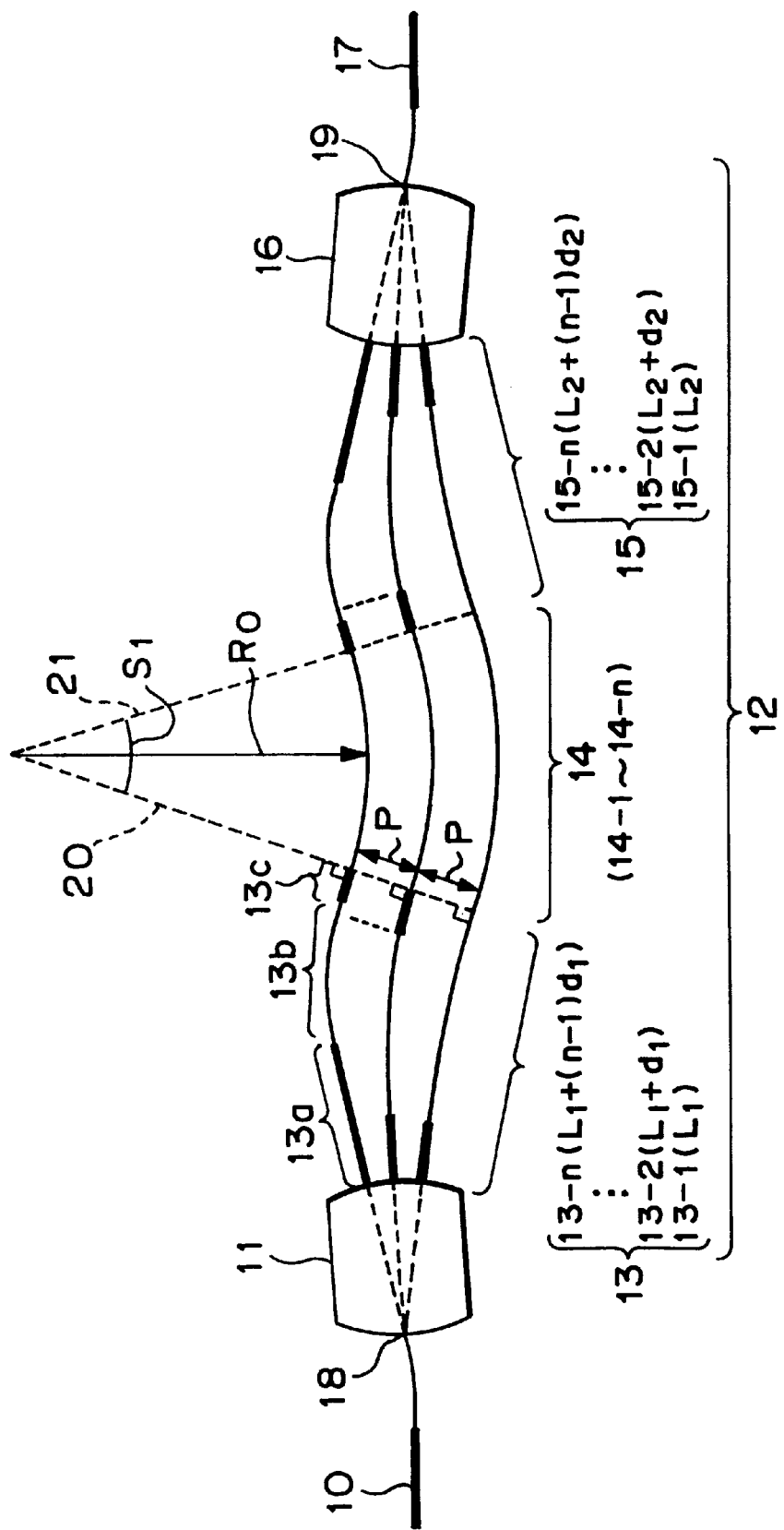
FIG. 3 is a schematic view showing a first embodiment of the optical arrayed waveguide grating filter.

FIG. 3 is a schematic view showing the embodiment of the optical arrayed waveguide grating.

The optical arrayed waveguide grating of the present embodiment, as shown in FIG. 3, comprises an input waveguide or input waveguides 10, an input side slab waveguide lens 11, an arrayed waveguides 12, an output side waveguide lens 16, and an output waveguide or output waveguides 17, and is arranged as follows.

1) The optical length of the arrayed waveguides 12 monotonically increases or decreases by a constant value between the adjacent waveguides.

2) The arrayed waveguides 12 comprises an input side waveguide block 13, an intermediate waveguide block 14, and an output side waveguide block 15.

3) The intermediate waveguide block 14 comprises a fan-formed bend waveguide block which is coaxial, equal in vertical angle, and monotonically increases or decreases in radius between adjacent waveguides.

4) The input side waveguide block 13 and the output side waveguide block 15 are line symmetrical about the bisector of the vertical angle of the intermediate waveguide block 14.

5) The input side waveguide block 13 comprises a first straight waveguide block 13a, a bend waveguide block 13b, and a second straight waveguide block 13c in this order from the input side slab waveguide lens 11 side, and the bend waveguide block 13b are smoothly connected to the first and second straight waveguide blocks 13a and 13c.

6) The optical length of the input side waveguide block 13 monotonically increases or decreases by a constant value between adjacent waveguides.

7) The waveguides of the first straight waveguide block 13a, when extended, all cross at an input side focus 18 of the input side slab waveguide lens 11.

8) The input side waveguide block 13 is smoothly connected to the intermediate waveguide block 14.

First, a first arrayed waveguides as the input side waveguide block 13 will be described.

By giving desired filter properties, the number of input/output waveguides, a focal length f of the slab waveguide lens, an open angle S from the lens focus of the arrayed waveguides, the number n of the arrayed waveguides, and a required optical length difference $d_0$ of the arrayed waveguide grating are determined.

Next, the construction of the first arrayed waveguide block 13 is determined as follows.

In the present embodiment, individual waveguides (13-1 to 13-n) of the first arrayed waveguide block 13 have an optical length difference of $d_1$ between adjacent waveguides, when the lower side waveguide in FIG. 3 is referred to a first waveguide (13-1), optical length of the individual waveguide sequentially (13-2, . . . , 13-n) monotonically increases ($L_1$, $L_1+d_1$, . . . , $L_1+(n-1)d_1$).

Further, the individual waveguides must be disposed so that they cross perpendicularly to a first reference line 20 from the vertical angle of the waveguide 14 for connecting the arrayed waveguides, and an adjacent cross point distance to the first reference line 20 is a constant value (p).

However, to avoid unnecessary coupling between the individual waveguides (13-1 to 13-n), the value p must be not less than a value determined by the waveguide structure.

Still further, p is preferably its smallest value to reduce the size of the entire circuit.

Here, the optical length difference $d_1$ may be theoretically an optional value because it is eventually adjusted by the connection waveguide.

Layout of such an arrayed waveguide can be designed by forming each optical waveguide (13-1, 13-2, . . . ,13-n) from the first straight waveguide 13a present on the extension of the straight line radially coming from the input side focus 18 of the first slab waveguide lens 11, the bend waveguide 13b smoothly connecting to the first straight waveguide 13a, and the second straight waveguide 13c having an equal inclination at the connection point to the bend waveguide 13b and the extension perpendicularly crossing to the first reference line 20, and appropriately adjusting the lengths of the straight waveguides, the radius of the bend waveguide, and the open angle of the bend.

In FIG. 3, when showing the first arrayed waveguides 13 and the second arrayed waveguides 15, the thick line indicates the straight waveguide, and the thin line indicates the bend waveguide.

Design value of the waveguide length at the part crossing the reference line has a flexibility.

That is, even when the straight waveguide of the same length is added to or subtracted from these straight waveguides 13c, the geometrical layout required for the present invention is satisfied.

However, the total length of the circuit is desirably as short as possible, the present embodiment shows the straight waveguide 13c of the smallest length, and in FIG. 3, the length of the second straight waveguide 13c of the lowest waveguide 13-1 in the Figure is zero.

Further, as a matter of course, it is desirable that all the radius of the bend waveguide 13b is greater than a minimum radius $R_0$ causing an unnecessary optical loss increase.

Next, the second arrayed waveguides as the output side waveguide block 15 will be described.

The second arrayed waveguide block 15 and the first arrayed waveguide block 13 may be disposed line symmetrically about the bisector of the vertical angle $S_1$ of the arrayed waveguide block connecting waveguide 14.

In this case, the optical length difference $d_2$ generated in the second arrayed waveguide block 15 is equal to the optical length difference $d_1$ generated in the arrayed waveguide block 13.

However, the arrayed waveguide grating of the present invention is not limited to the above line symmetrical arrangement. That is, it is sufficient that the waveguide spacing p at the cross point of the output side channel waveguide block 15 and a second reference line is equal to the spacing P between adjacent cross points in the first arrayed waveguide block 13, lengths of the straight lines and bend constituting the second arrayed waveguide block 15 are varied, and the resulting optical length difference $d_2$ is not necessary to be equal to the optical length difference $d_1$ of the first arrayed waveguide block 13.

Next, the structure of the arrayed waveguide block connecting waveguide as the intermediate waveguide block 14 will be described.

The arrayed waveguide block connecting waveguide 14 comprises a fan-formed bend waveguide block (14-1 to 14-n), in the bend waveguide having the smallest radius, the center of the circle is on the first reference line 20 and the second reference line 21, the bend waveguide block has an open angle of $S_1$ which is all equal to each other, and the smallest radius of the bend waveguide group is $R_0$.

To achieve a compact circuit, the smallest radius $R_0$ is preferably equal to the minimum radius that can avoid the above-described optical loss increase.

In the arrayed waveguide block of the present invention, the bend connecting waveguide block (14-1 to 14-n), of which the center is on the first reference line 20 and the second reference line 21, the open angle is the same vertical angle $S_1$, and the radius increases by an increment of p, are sequentially connected to the first arrayed waveguide block (13-1 to 13-n). The optical length difference generated in the bend waveguide group monotonically increases or decreases by a constant value between adjacent waveguides, which is automatically given by the formula: $S_1 \times p$.

Therefore, a desired optical length difference $d_0$ can be obtained when the open angle ($S_1$) of the bend waveguide block of the arrayed waveguide block connecting waveguide 14 is set, since $S_1 \times p = d_1 + d_2 \pm d_0$ (either of ± is possible) is met.

<Second embodiment>

Figure 4:
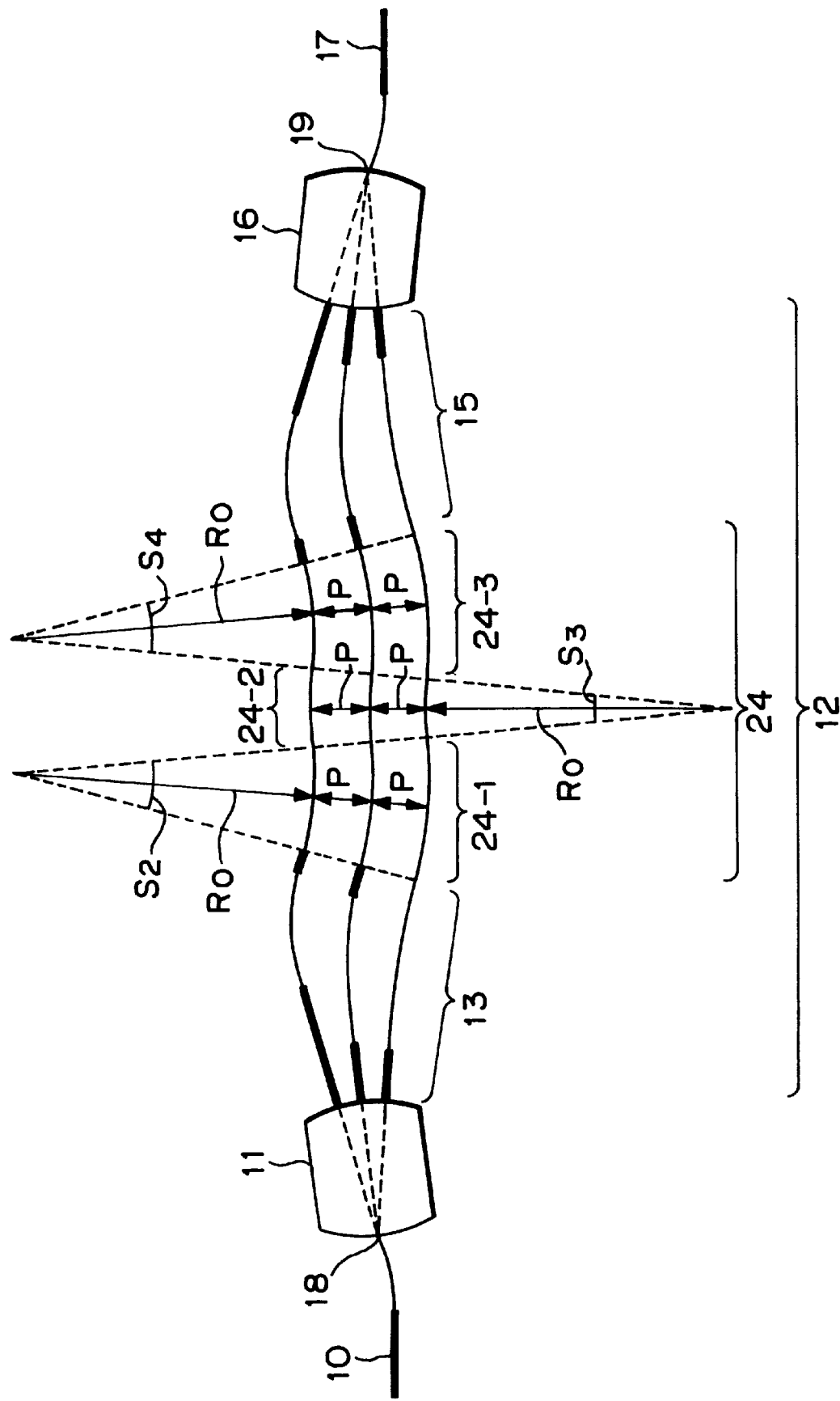
FIG. 4 is a schematic view showing a second embodiment of the optical arrayed waveguide grating filter.

FIG. 4 is a schematic view showing a second embodiment of the arrayed waveguide grating according to the present invention.

In the present embodiment, the connecting waveguide 14 of the arrayed waveguide grating of the first embodiment is divided into an odd number of units, and the adjacent waveguides are all fan-formed waveguides, of which the vertical angles are provided at alternate positions.

That is, while the connecting waveguide 14 in the first embodiment comprises a single fan-formed bend waveguide block, in the present embodiment, it comprises three fan-formed bend waveguide blocks 24-1, 24-2, and 24-3.

In FIG. 4, the minimum radii of the bend waveguides 24-1, 24-2, and 24-3 are all the same radii ($R_0$), which are not necessarily the same, but are preferably greater than the minimum radius that does not generate an optical loss increase, and smoothly connected.

The present embodiment provides the same function as that of the first embodiment when $(S_2+S_4-S_3) \times p = d_1 + d_2 \pm d_0$ is met.

Preferred embodiments showing the effect of the present invention will be described, however, the present invention is not limited to the embodiments.

Embodiment 1

The result of waveguide layout of the arrayed waveguide grating filter made based on the embodiment shown in FIG. 3 is shown in FIG. 5.

Figure 5A:
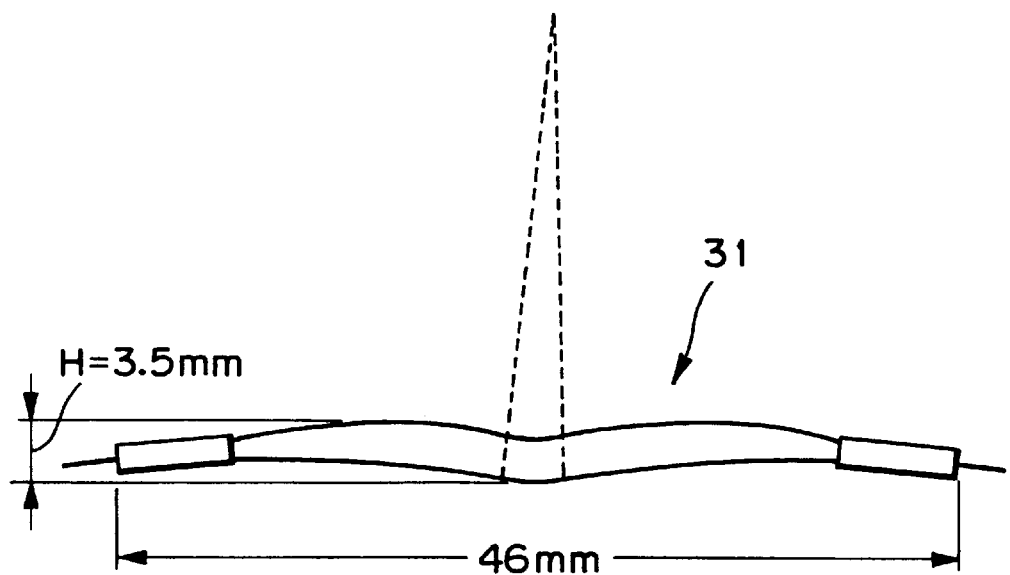
FIG. 5A is a schematic view showing waveguide layout of the embodiment of the arrayed waveguide grating filter according to the present invention.

FIG. 5A is a waveguide layout example based on the filter design of an equivalent refractive index of waveguide of 1.45, a minimum bend radius of 5 mm, a central wavelength of about 1552 nm, a frequency interval of 2000 GHz, and an FSR of about 47000 GHz.

The filter of such properties is required to have a slab waveguide lens focal length of about 6600 $\mu$m, 81 arrayed waveguides, and an optical length difference $d_0$ of about 4.28 $\mu$m.

An example of waveguide layout of an arrayed waveguide grating filter 31 according to the present invention shown FIG. 3 is shown in FIG. 5A.

Figure 5B:
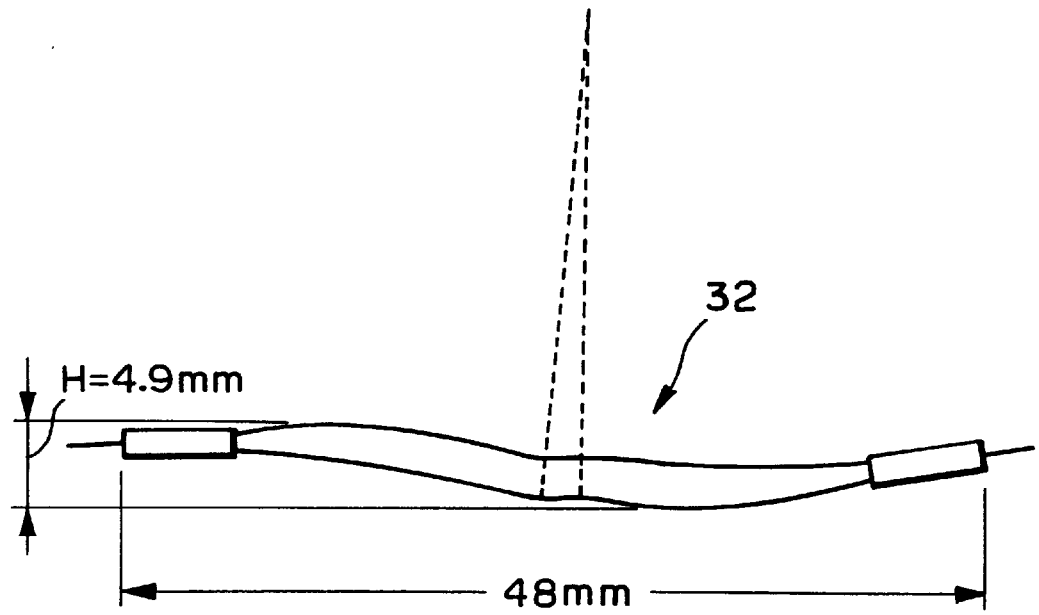
FIG. 5B is a schematic view showing waveguide layout of the second prior art embodiment of the arrayed waveguide grating filter.

Further, in the above-described prior art embodiment 1, such a geometrical layout which satisfies these properties cannot be found. An example of arrayed waveguide grating filter 32 is shown in FIG. 5B, which is laid out based on the prior art embodiment 2 with a waveguide spacing on the reference line of 30 $\mu$m.

Figure 6:
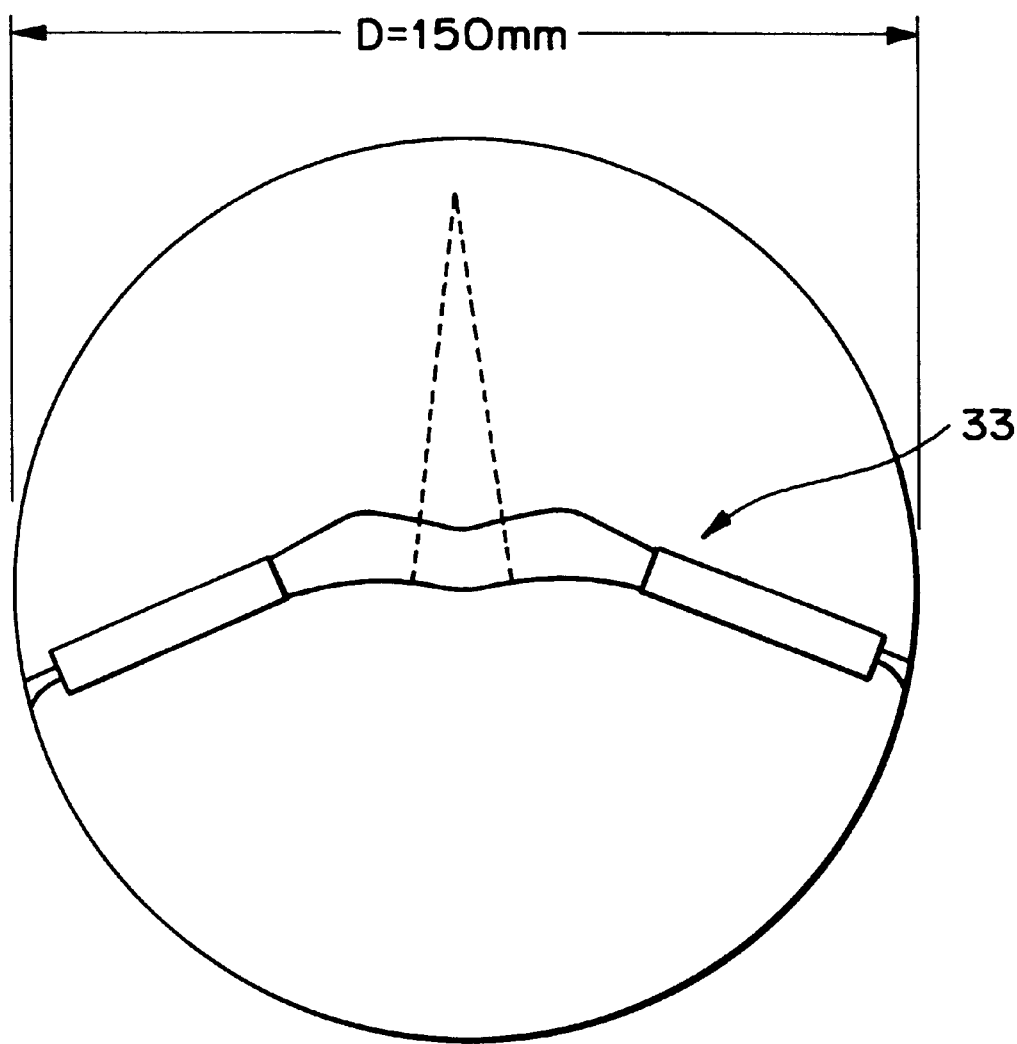
FIG. 6 is a schematic view showing waveguide layout of the embodiment of the arrayed waveguide grating filter according to the present invention.

Further, FIG. 6 is an example of waveguide layout of an arrayed waveguide filter 33 with a frequency interval of about 100 GHz, an FSR of about 14600 GHz, and an optical length difference $d_0$ of about 13.4 $\mu$m.

It can be seen that the circuit is contained in a circle with a diameter (D) of 15 cm.

In the prior art example 1, the horizontal width of the circuit is as large as 20 cm.

As can be seen from the result of the above embodiment, when making layout according to the present invention, since the individual components are disposed almost on a straight line as shown in FIG. 5A, an effect for reducing the circuit width, and avoidance of limitation of substrate size as shown in FIG. 6 can be achieved.

With such properties, an inexpensive optical filter can be provided.

Embodiment 2

Figure 7A:
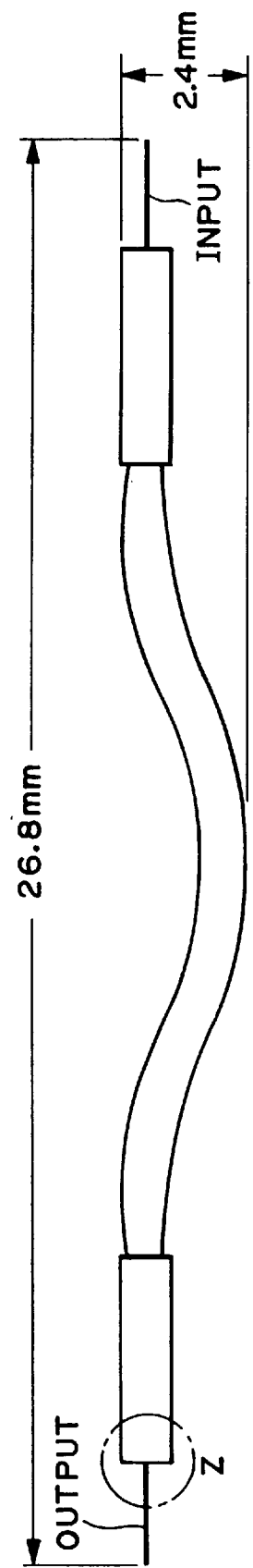
FIG. 7A is a schematic view showing waveguide layout of the embodiment of the arrayed waveguide grating filter according to the present invention.
Figure 7B:
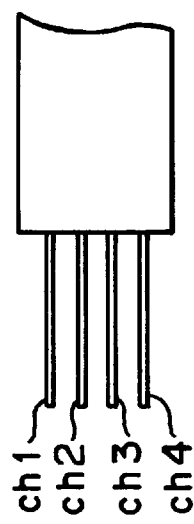
FIG. 7B is an enlarged schematic view of section z in FIG. 7A.

FIG. 7A shows a waveguide layout of the arrayed waveguide grating filter made based on the embodiment shown in FIG. 3.

The arrayed waveguide grating filter of FIG. 7A is based on filter design with a channel spacing of 16000 GHz, an FSR of about 200,000 GHz, and a central wavelength of 1.52 $\mu$m. Such a filter is required to have an optical length difference $d_0$ of about 0.97 $\mu$m, a slab waveguide lens focal length of about 4030 $\mu$m, and 44 arrayed waveguides.

Figure 8:
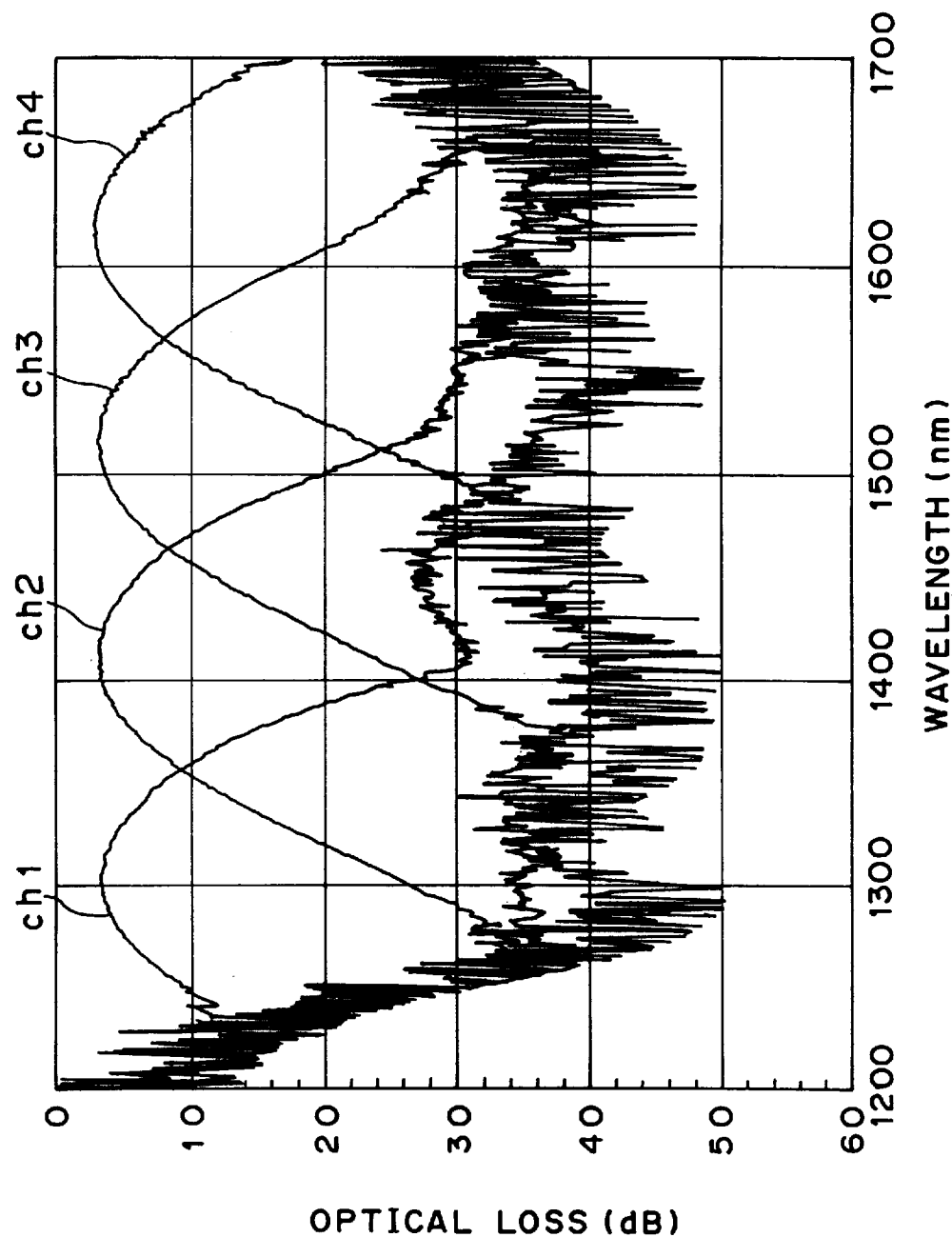
FIG. 8 is a graph showing a optical loss when making a 4-channel wave division using the embodiment of the arrayed waveguide grating filter according to the present invention.

The optical loss of the case of 4 channels (ch1, ch2, ch3 and ch4) is investigated using this arrayed waveguide grating filter. The result is shown in FIG. 8.

It can be found from the result that when wave division of light is made using the arrayed waveguide grating filter of the present invention, wave division is efficiently made with reduced optical loss.

As described above in detail with experimental examples, according to the present invention, since the individual components are disposed almost on a straight line, the circuit wide can be reduced and limitation of substrate size can be avoided.

Therefore, by this effect, an inexpensive optical filter can be provided. Further, an optical filter with wide FSR can be provided at a low price.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An arrayed waveguide grating comprising an input waveguide or input waveguides, an input side slab waveguide lens, arrayed waveguides, an output side slab waveguide lens, and an output waveguide or output waveguides, characterized in that:

an optical length of said arrayed waveguides monotonically increases or decreases by a constant value between adjacent channel waveguides;

said arrayed waveguides comprises an input side waveguide block, an intermediate waveguide block, and an output side waveguide block;

said intermediate waveguide block comprises an odd number of fan-formed waveguide block, said fan-formed waveguide block is a bend waveguide block which is coaxial, equal in vertical angle, and monotonically increases or decreases in radius between adjacent waveguides, and vertical angles of waveguides of said odd number of fan-formed waveguide blocks are disposed alternately, and said individual waveguide blocks are smoothly connected; and said input side waveguide block and said output side waveguide block are disposed line symmetrically about a bisector of the vertical angle of said intermediate waveguide block.

2. The arrayed-waveguide grating as claimed in claim 1, wherein the number of said fan-formed waveguide block constituting said intermediate waveguide block is one.

3. The arrayed-waveguide grating as claimed in claim 2, wherein:

said input side waveguide block and said output side waveguid block comprise a first straight waveguide block, a bend waveguide block, and a second straight waveguide block from the side closer to said input side slab waveguide lens and said output side slab waveguide lens, and said bend waveguide block comprises a bend waveguide block smoothly connecting to said first straight waveguide block and said second straight waveguide block;

optical lengths of said input side waveguide block and said output side waveguide block monotonically increase or decrease by a constant value between adjacent waveguides; and said input side waveguide block and said output side waveguide block smoothly connect to said intermediate waveguide block.

4. The arrayed-waveguide grating as claimed in claim 3, wherein all radii of said bend waveguide block are greater than a minimum radius $R_0$ that causes an unnecessary increase of optical loss.

* * * * *